A. R. SHERMAN.
Gate Operating Mechanism.

No. 205,217.   Patented June 25, 1878.

Attest:
F. B. Brock
D. G. Stuart

Inventor:
Albert R. Sherman
per L. Hannay
Attorney.

UNITED STATES PATENT OFFICE.

ALBERT R. SHERMAN, OF NATICK, ASSIGNOR TO STEPHEN A. JENKS, OF LINCOLN, RHODE ISLAND.

IMPROVEMENT IN GATE-OPERATING MECHANISMS.

Specification forming part of Letters Patent No. 205,217, dated June 25, 1878; application filed February 18, 1878.

*To all whom it may concern:*

Be it known that I, ALBERT R. SHERMAN, of Natick, in the county of Kent and State of Rhode Island, have invented certain new and useful Improvements in Gate-Operating Mechanisms; and I do hereby declare that the following is a full, clear, and exact description thereof, which will enable others skilled in the art to which it appertains to make and use the same, reference being had to the accompanying drawings, and to letters of reference marked thereon, which form a part of this specification, in which—

Figure 1:
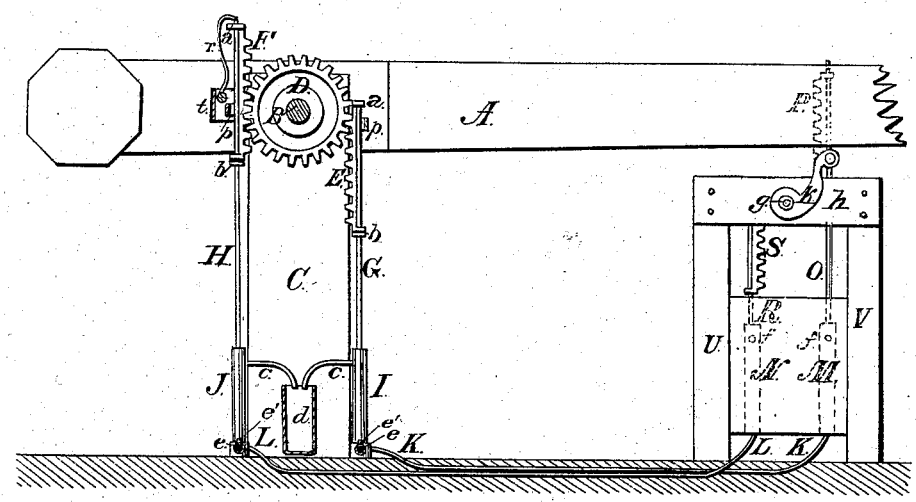
Figure 3:
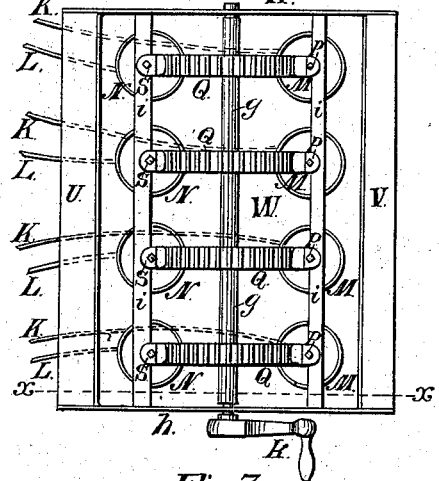
Figures 2, 4:
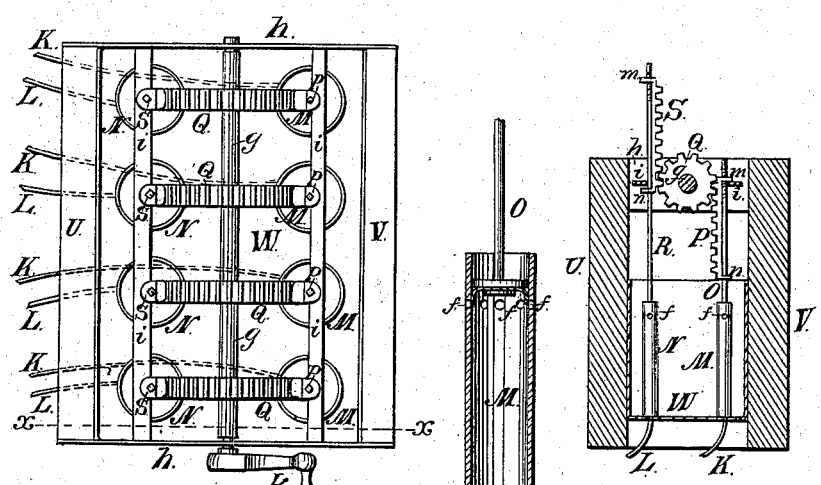

Figure 1 represents a side elevation and partial section of a gate to which my improved operating devices are applied. Fig. 2 represents a vertical section of the hydraulic forcing apparatus as the same would be taken through the line $x\,x$ of Fig. 3. Fig. 3 represents a plan, on an enlarged scale, of the hydraulic forcing apparatus suitable for simultaneously operating four gates arranged at the four corners of a street at a railroad-crossing; and Fig. 4, a vertical section of one of the forcing-pumps, on an enlarged scale, and may also represent a similar view of one of the operating cylinders and pistons, with the exception that the opening $f$ below the piston in the latter should be arranged above, and that there should be two openings in the side of the cylinders at the bottom for a stop-cock connection and pipe-connection.

My improvement is more particularly designed to be applied to the improved gate-operating mechanism for which I received Letters Patent No. 186,763, and which bear date January 30, 1877.

In the mechanism shown and described in that patent each gate was depressed by hydraulic power communicated through the action of a single force-pump and pipe to a piston and rod suitably connected to a crank secured to the gate, after which the latter was raised by the sucking action of the pump on withdrawing the pressure from it, which thereby created a vacuum beneath the piston, the drawing of which had previously depressed the gate, and thus allowed the pressure of the air above it to force it down into its cylinder, and thereby raise the gate. This plan, while it works, does not act so speedily and well as is desirable, and it is to remedy this defect that is the main object of the present improvement.

The improvement consists, first, in combining two actuating pistons and cylinders and suitable intermediate mechanism with the gate, the one to raise and the other to depress it; secondly, in the apparatus for operating these devices; and, thirdly, in combining therewith—that is to say, the gate, two actuating pistons and cylinders—suitable apparatus for operating these devices.

To enable others skilled in the art to make, use, and construct my improvement, I will now proceed to describe it in detail, omitting a particular description of such parts of the mechanism as is old, known, and well understood.

In the drawing, Fig. 1, the gate A is represented as being what may be termed a "pivoted-balance gate;" but it is not essential that it should be balanced, although I prefer to use it so.

Gate A is mounted upon, and rigidly secured in any suitable and well-known way to, a rock-shaft, B, which has its bearings in two side plates secured to the upper end of the two standards C, (or, if desired, it may be a single bifurcated standard,) which form the frame-work of the gate.

On the rock-shaft B, between the standards, is rigidly secured a gear-wheel, D, into the teeth of which mesh the teeth of two rack-bars, E and F, the one, E, being arranged on the one peripheral side of the gear, and the other, F, on the opposite side. Each of these rack-bars is provided with two lugs, $a$ and $b$, one, $a$, at its upper end, and the other, $b$, at its lower end. Through an opening in each of the two lugs of each rack-bar passes the upper end of a piston-rod, and which is firmly, and, if desired, adjustably, secured in any suitable and known way to the upper one, $a$.

Rack-bar E is carried and operated by piston-rod G, and rack-bar F by piston-rod H. Each of these rods G and H carries on its lower end a piston of suitable construction, and which, respectively, operate in the cylinders I and J—piston-rod G and its piston in cylinder I, and piston-rod H and its piston in cylinder J. Both cylinders are closed at bottom and open at top. Immediately in the rear of each of the piston-rods, opposite the rack-bars, is arranged a guide-bar, $p$, in which is formed a groove, in which the piston-rods fit and play, and which serves to keep the rack-bar in gear with the gear-wheel D. These guide-bars are secured to the end sides of the standards C. Immediately behind the rear one of these guide-bars is similarly secured to the standards a bracket, $t$, to which is pivoted a curved catch or check-hook, $r$, which, when the gate is raised and its motion stopped, is thrown down over a tooth of the gear, and thus holds it in its elevated position. The pivoting of the lower end of the check-hook is so arranged with respect to the piston-rod and rack-bar as to allow the upper lug $a$ of the latter to pass freely between it and the standards C in its descent until it is arrested by the bar $p$. The lower end of the check-hook is formed with an inward bend or curve, so that when thrown down between the teeth of the gear-wheel to check the backward or downward movement of the gate the bent or curved portion will project over and lie in immediate proximity to the upper lug $a$ of the rack-bar. Thus, when the latter commences to rise through the application of power to its operating-piston, the lug $a$ will immediately act upon the curved portion and throw the check-hook back, and thereby free the gear and allow the gate to be depressed.

Near the upper or open end of each cylinder, on its side, is formed a small orifice, in which is secured a drip-spout, $c$, through which any fluid which may have passed the piston is led off into a small receiving-tank, $d$. These spouts $c$ are arranged immediately above the upper side of the pistons when at the highest point of their stroke. The tank $d$, when nearly filled, is intended to be removed and emptied into the pump-filling reservoir, shortly to be described.

At the lower or closed end of each of these cylinders are inserted two tubular connections, both of which communicate with its interior. Into the one, $e$, is inserted a cock, $e'$, for a purpose to be hereinafter described. Into the end of the other is secured, in any suitable and known manner, the end of a pipe, the other end of which may either communicate directly with a steam-boiler, or with the service-pipe of a water-main under pressure, provided with suitable cocks to turn it on and let it escape, or with the lower end of an actuating-pump, by means of which power may be applied to the piston.

In the drawing (see Fig. 1) these pipes are represented as communicating directly at the bottom with two force-pumps, as shown by Fig. 2—the pipe K of cylinder I with the force-pump M, and the pipe L of cylinder J with the force-pump N. For many places this latter mode is preferred, as steam may not always be convenient, nor water under pressure to be had; otherwise, however, they will both work well.

The pumps M and N are open at top and closed at the bottom, save when communication is had between them and their respective pipes K and L. Both pumps are arranged together, for convenience' sake, in a common tank, although not necessarily so. Both are provided near their upper ends with one or more orifices, $s$, to supply the necessary fluid to them, and to provide for waste in the cylinders I and J. These orifices $f$ are arranged at a point immediately below the under side of the pump-pistons when raised to the full height of their upward stroke, as shown in Fig. 4. Each piston carries a piston-rod, on the upper end of which is mounted and secured a rack-bar, in the same manner as the rack-bars E and F on the rods G and H. In other words, the piston of the pump M carries the rod O and rack-bar P, and the piston of pump N the rod R and rack-bar S. These rack-bars P and S are so arranged as to respectively mesh on the opposite peripheral sides of a gear-wheel, Q. Gear Q is mounted on a rock-shaft, $g$, which has its bearings in two side plates, $h$, or cross-pieces, which fasten the upper ends of the standards U and V together, and which constitute the frame that supports the working apparatus of the pump, and the tank W, which holds the fluid that supplies the pumps. These rack-bars are so arranged with respect to each other and the gear that when the one is at the end of its upward stroke the other will be at the end of its downward stroke, and the same is true of the rack-bars E and F.

On one end of the rock-shaft $g$ is secured a crank-lever, $k$, by which motion is imparted to the gear-wheel Q, and through it to the rack-bars, piston-rods, and pistons of the pumps. At the back of each rack-bar is arranged a guide-bar, $i$, to keep them in place and in gear with gear Q. These bars for this purpose are secured to the side plates $h$, and are provided with a vertical semicircular groove, into which the piston-rods fit and play. The bars $i$ also serve as stops to the motion of the rack-bars in their upward and downward movements. This is effected by means of the lugs $m$ and $n$ on the upper and lower ends of the rack-bars, and which, while serving to secure the latter to the piston-rods, also serve to stop their movement when alternately brought in contact with the bars $i$.

The rack-bars are adjustably secured to the piston-rods, and may be done in various ways. One method is shown in the drawing. This consists in simply passing the end of the piston-rod freely through the lower lug $n$, and then screwing its upper end into the upper lug $m$, for which purpose that lug is provided with a female screw, and the upper end of the rod with a corresponding screw-thread, and its extreme end squared, as with an angular boss, for the application of the adjusting key or wrench. By these means the rack-bars can be adjusted with respect to each other, and one set of pumps made to act sooner or later than another set, if desired.

The operation is simple. The tank W is first filled so that the liquid used as a medium for communicating the power from the pumps M and N to the pistons in the cylinders I and J shall be above the line of the small orifices $f$ in the pump-cylinders.

The filling of the tank is effected in the following manner: One of the pistons of the two cylinders I and J is first depressed to the lower end of its stroke, which brings it to a level with the upper side of its pipe K or L, as the case may be—as, for instance, the piston of cylinder I on a level with its communicating pipe K. The piston of its corresponding pump M is then raised to the full height of its upward stroke, and which brings it above the orifices $f$ in its cylinder. The cock $e'$ in the small tube $e$ at the base of cylinder I is then opened, and the tube of a force-pump or other filling device inserted, and the liquid intended to be used in the apparatus then forced through pipe K into pump-cylinder M, and through the orifices $f$ into the tank W. This is continued until all the air on the under side of the piston of cylinder I and in the pipe K and pump-cylinder M has been completely expelled, when the cock $e'$ is closed, and the filling apparatus applied in the same manner to the tube $e$ of cylinder J, its piston, however, being first depressed, and the piston of its corresponding pump N raised to the full end of the stroke. The liquid is then forced through pipe L and cylinder N, and from the latter, through its orifices $f$, into the reservoir W, until the latter has been filled as full as desired—i. e., at a point above the orifices $f$ of both cylinders.

Thus prepared, the operation is as follows: (See Fig. 1:) The crank-handle $k$ is turned so as to depress the rack-bar P, piston-rod O, and its piston into the pump-cylinder M. This action forces the liquid from cylinder M through pipe K into cylinder I, and thereby forces up its piston, and its rod G and rack-bar E, and in so doing causes the gear D to turn, and with the latter the gate A, which is fast to its shaft, until the gate has been brought to a vertical position, at which point the motion is stopped by the lower lug $b$ of the rack-bar E coming in contact with the under side of the stop-bar $p$. Simultaneously with these movements of the two rack-bars P and E a corresponding but reverse movement has taken place in the two rack-bars S and F—i. e., rack-bar S has been raised and rack-bar F depressed—thus placing them in the requisite position to depress the gate and close the passage across the street or road whenever desired. This is effected by simply reversing the direction or motion of the crank $k$ and its pinion Q, by doing which the rack-bar S, piston-rod R, and its piston are depressed, thereby forcing the liquid from pump N through pipe L into cylinder J, and raising piston-rod H and rack-bar F, and in so doing turning gear D, and with the latter the gate A, until it resumes the position shown in Fig. 1, at which point it is stopped by the lug $b$ on rack-bar F coming in contact with stop $p$. Simultaneously therewith the pinion Q has raised rack-bar P ready for operation again to open the gate, and so on alternately and successively.

Here it is to be observed that I do not mean to confine myself in this application to the use of rack-bars and gears as the means of operating the pumps M and N, or of the gate A, as these operations may be effected in any known and suitable way—as, for instance, in the ways shown in my former patent and before referred to; but I prefer the method here shown as being simple, effective, and not liable to get out of order. Nor do I confine myself to any particular kind of liquid, such as water, oil, &c., as the means of transferring the power from the force-pumps M and N to the pistons of the cylinders I and J, as any suitable known liquid may be used, preferring to use such as is least liable to become frozen or evaporated.

The parts hitherto described are the parts necessary and common for the operation of a single gate under my present improvement, and for every additional gate used it must be provided with a duplicate set. In order, however, to bring them under the control of a single attendant, I propose, no matter where the additional gate or gates are placed, to arrange the pumps which operate them side by side on the same reservoir with the pumps M and N, and to mount their operative pinions upon the same shaft $g$ that operates the gear Q, so that by simply turning the one crank, $k$, the different sets of pumps will all be operated simultaneously. Such an arrangement is illustrated in Fig. 3, where there are shown four sets of pumps and communicating-pipes for the simultaneous operation of four different gates, arranged at four separate points, as at the four corners of street-crossings.

Various other modes of operating these pumps simultaneously might be described and shown; but it is not deemed necessary, as it would not alter the principle of the invention or the mode of operating the same.

The gate is intended for use on railroad and street crossings, ferries, draw-bridges, bridges, &c.

Having described my invention, what I claim as new, and desire to secure by Letters Patent, is—

1. In combination with a pivoted gate, two cylinders and two actuating-pistons, connected by intermediate mechanism, substantially as described, whereby as the one is moved in one the other is thereby moved in the opposite direction, for the purpose set forth.

2. The combination of two cylinders, I and J, two pistons and rods, G and H, two rack-bars, E and F, and gear D with a pivoted gate, substantially as described.

3. In combination with a pivoted gate, two pipes, K and L, two cylinders, I and J, and two pistons, connected together by intermediate mechanism, substantially as described, whereby they are simultaneously moved in opposite directions, for the purpose set forth.

4. The combination of the piston-rod H, rack-bar F, and pivoted check-hook $r$ with the pinion D, substantially as and for the purpose set forth.

5. The combination of a stop with a piston-rod carrying a rack-bar, and the latter provided at its upper and lower ends with a lug, for the purposes set forth.

6. The combination of two force-pumps, M and N, two pipes, K and L, two cylinders, I and J, and their respective pistons with a pivoted gate and intermediate mechanism, substantially as described, for operating the same.

7. The combination of two force-pumps, M and N, two pipes, K and L, two cylinders, I and J, and their respective pistons and piston-rods G and H, two rack-bars, E and F, and gear D with a pivoted gate, in the manner substantially as and for the purpose set forth.

8. The combination of the crank $k$, rock-shaft $g$, gear Q, rack-bars P and S, and piston-rods O and R, and their respective pistons or equivalent devices, pump-cylinders M and N, and pipes K and L with cylinders I and J, and their pistons and piston-rods G and H, and the gate A, and intermediate mechanism, substantially as described.

9. The combination, with a tank, W, of two or more sets of force-pumps provided with mechanism, substantially as described, for operating the same simultaneously.

In testimony that I claim the foregoing as my own I affix my signature in presence of two witnesses.

ALBERT READ SHERMAN.

Witnesses:
   D. G. STUART,
   P. HANNAY.